Patented Oct. 4, 1938

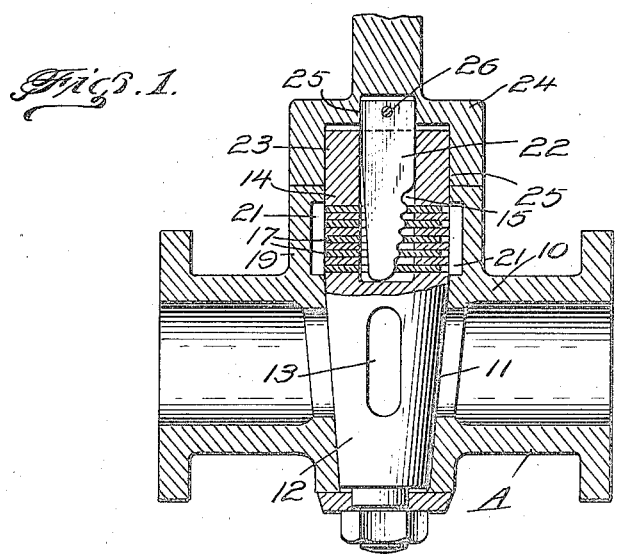
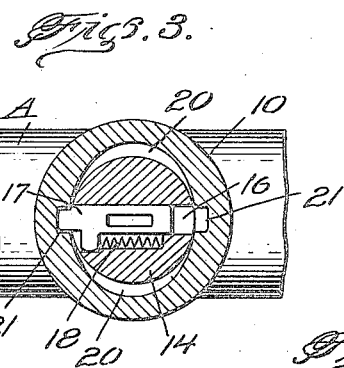
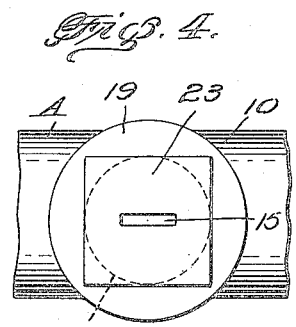
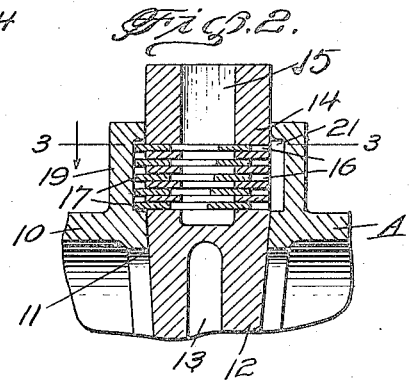

2,132,315

UNITED STATES PATENT OFFICE 2,132,315

LOCK VALVE

John D. Newell, Nashville, Tenn.

Application December 7, 1936, Serial No. 114,697

2 Claims. (Cl. 251—6)

The invention relates to a valve and more particularly to a lock valve for water, gas, air or the like mains.

The primary object of the invention is the provision of a valve of this character, in this instance of the turn plug type, wherein the plug carries lock tumblers for control by a key and these tumblers will lock the plug or the valve in a closed position so as to prevent dishonest persons from opening the valve when in a closed position.

Another object of the invention is the provision of a valve of this character, wherein the construction of the same is novel in form and is unlocked from a closed position by a key carried by a turning flange engageable with the turn plug of the valve for opening and closing of the same.

A further object of the invention is the provision of a valve of this character, which is simple in construction, compact in its make-up, thoroughly reliable and efficient in operation, possessing few parts, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical longitudinal sectional view through the valve constructed in accordance with the invention and its turning plug being in closed position.

Figure 2 is a fragmentary view similar to Figure 1 showing the turning plug locked in closed position.

Figure 3 is a sectional view on the line 3—3 of Figure 1 looking in the direction of the arrow.

Figure 4 is a top plan view of Figure 2.

Similar reference characters indicate corresponding parts throughout the several views in the drawing.

Referring to the drawing in detail, A designates generally a portion of the valve which includes a valve casing 10 adapted to be secured as a union to appropriate pipes in the usual manner. Within the casing 10 between the pipe nipples thereof is the usual tapered valve seat 11 for a plug turn valve 12 having the usual cross passage 13 for regulating the flow of fluid therethrough when the said passage is open and to shut off the flow on the closing of the same. The opening and closing of the passage 13 is had by the turning of the valve plug 12.

This plug 12 at the upper portion thereof is formed with a tumbler cylinder extension 14 having the central key slot 15 intersected crosswise by the guide ways 16 for locking tumblers 17, each urged in locking position through a coiled tensioning spring 18 suitably fitting within this cylinder.

Formed on the body 10 above the plug seat 11 is a circular lock housing 19 which at its top is open for accommodating the cylinder 12. The interior of the housing 19 is formed with an elliptical shaped space 20 while aligned with the shorter axis of this space 20 in the inner wall of the said housing are formed opposed keeper notches 21 for accommodating the tumblers 17 for double lock action thereof so that the plug 12 may be locked in an adjusted position and this locking is had when the passage 13 is closed in the said plug shutting off flow through the valve. After the tumblers 17 have been withdrawn from the keeper notches 21 and the plug 12 has been turned through ninety degrees, a key 22 inserted in the key slot 15 may be removed by reason of the fact that the tumblers 17 will be located in the longer axis of the elliptical space 20. This key 22 controls the throwing of the tumblers 17 to releasing position. The key slot 15 opens outwardly through the center of a flat faced wrench engaging portion 23 formed at the upper end of the cylinder 14 and this portion 23 protrudes through the open top of the housing 19 to be exposed exteriorly thereof for engagement therewith of a turning wrench 24 of the socket type, the key 22 being fixed centrally of this wrench 24 within its socket 25. Thus on the application of the wrench with the portion 23 the key will become inserted in the key slot 15 in the cylinder 14 to act upon the tumblers 17 carried within this cylinder for operating the same whereby the plug 12 may be unlocked for the turning thereof.

The key 22 is anchored in the wrench 24 by a securing pin or other fastener 26.

The cylinder 14, a part of the plug 12, snugly fits the open top of the housing 19 built on the valve casing 10.

What is claimed is:

1. A valve of the character described comprising a casing having a turn plug seat, a rotatable turn plug fitting said seat, a housing built on and rising from said casing and having a substantially elliptical shaped internal space, the said housing being open at its outer end, a circular lock cylinder formed with said turn plug and extended through the open outer end of said housing for a considerable distance beyond the latter and having a central key slot, said cylinder having a transversely disposed tumbler-receiving guide way transversely therein and intersecting the key slot, a plurality of slide tumblers confined in said way and having key receiving slots registering with the key slot in said cylinder, said housing having opposed keeper notches interiorly thereof at the shorter axis of the elliptical space for engagement by the tumblers, springs confined within the cylinder and active upon the tumblers for the engagement thereof in either of the keeper notches, the elliptical space between the notches being effective as eccentrics for said tumblers, and a manually turnable socketed head telescoped over the end of the lock cylinder projected from the housing for capping and closing the outer open end of said housing and having a key engageable in the slots in said tumblers for releasing the same from the keeper notches on the turning of the head at the outer open end of said housing.

2. A valve of the character described, comprising, a casing having a turn plug seat and fashioned with a housing formed with a substantially elliptical shaped internal wall, and a plug fitting said seat and rotatable between open and closed positions of said valve and fashioned with a lock cylinder equipped with spring-pressed tumblers disposed within said housing and operable by a key to unlocked positions therein, said wall formed with opposed keeper notches at the shorter axis thereof for receiving said tumblers to effect locking thereof when said plug is in valve closed position and said wall between said notches being effective as eccentrics for coaction with said tumblers when engaged thereby to hold said plug in unlocked position and to progressively resist rotation of said plug from said unlocked position to locked position when said plug is operated by means other than said key.

JOHN D. NEWELL.